Nov. 6, 1923.                                                    1,472,832
                         W. H. HENNINGS
                  WEEDING AND TRANSPLANTING DEVICE
                    Original Filed June 10, 1921
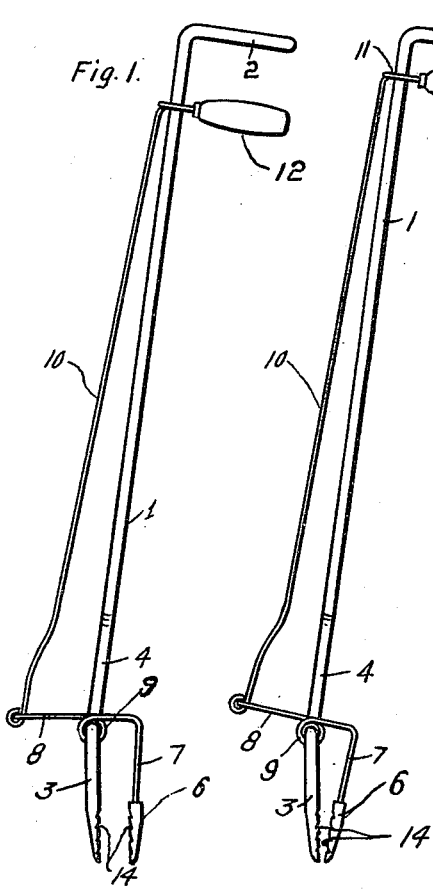
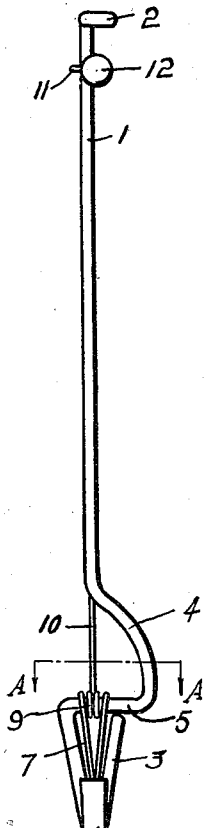
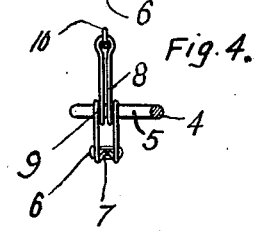
INVENTOR.
Wm. H. Hennings
BY
Chamberlin Brandenreich
ATTORNEYS.

Patented Nov. 6, 1923.

1,472,832

UNITED STATES PATENT OFFICE.

WILLIAM H. HENNINGS, OF CHICAGO, ILLINOIS.

WEEDING AND TRANSPLANTING DEVICE.

Application filed June 10, 1921, Serial No. 476,408. Renewed May 4, 1923.

*To all whom it may concern:*

Be it known that I, WILLIAM H. HENNINGS, a citizen of the United States, residing at Chicago, county of Cook, State of Illinois, have invented a certain new and useful Improvement in Weeding and Transplanting Devices, and declare the following to be a full, clear, and exact description of the same, such as will enable others skilled in the art to which it pertains to make and use the same, reference being had to the accompanying drawings, which form a part of this specification.

My invention has for its object to produce a simple and novel garden tool whereby the roots of plants may be gripped at a considerable distance below the surface of the ground and the plants be removed quickly and conveniently.

In one of its aspects my invention may be said to have for its object to produce a simple and novel garden tool in which the hand and the foot of the user may be effectively utilized in the digging up of weeds or plants to be transplanted, in such a manner that the heavy portion of the work may be done with the foot while the tasks to be performed by the hand are comparatively light; thus permitting the work of weed digging or transplanting to be done easily and conveniently and without fatiguing even a frail person.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a side elevation of a tool arranged in accordance with my invention, showing it in condition ready to be driven into the ground;

Fig. 2 is a view similar to Fig. 1, showing the jaws of the tool closed;

Fig. 3 is a front view of the tool;

Fig. 4 is a section taken approximately on line A—A of Fig. 3; and

Fig. 5 is a plan view of one of the two handles.

Referring to the drawing, 1 represents a long heavy rod having the upper end bent at right angles to form a handle, 2, or having a handle formed in some other convenient manner; the lower end of the member 1 being bent upwardly as indicated at 3, to form a V-shaped blade-like element. That portion of the rod just above the blade-like part is bent gradually outwardly as indicated at 4 and then laterally at right angles to the general direction of the rod to form a transverse or horizontal foot rest, 5, directly above the blade; the parts 4 and 5 forming in effect a stirrup. Co-operating with the blade 3 is a smaller and shorter blade, 6, lying directly in front of the lower end of the main blade and being supported on the free end of the vertical arm of an L-shaped frame, the other arm of which is horizontal and is pivotally supported midway between its ends on the foot rest, 5. The L-shaped frame may conveniently be made of a rod of comparatively small diameter folded upon itself midway between its ends; the free ends being brought together and permanently fastened to the blade 6; the two arms or legs being bent to give the frame an L-shaped appearance, and the long arm being then twisted or wrapped around the foot rest, 5, as shown in the drawing; the member 5 being thus completely encircled by at least two strands each of which has only a line contact with the foot rest, thus reducing the frictional resistance to pivotal movement of the frame on the foot rest to a minimum. The L-shaped frame made out of a single doubled rod thus consists of an approximately vertical arm, 7, lying in front of the blade 3 and an approximately horizontal arm, 8, extending from front to rear past the foot rest, having near the inner end thereof an eye, 9, surrounding the foot rest on the main rod or stem of the tool. The free end of the arm 8 is connected to the lower end of a rod, 10, which extends upwardly beside that portion of the member 1 lying between the stirrup and the handle and which may be designated the stem of the tool, to a point near the handle, 2, and is there bent into the form of an eye, 11, surrounding the stem. After being bent to form the eye 11, the free end of the rod 10 is carried into a handle, 12, lying below the handle 2.

The parts are so proportioned that when the blade 3 and the arm 7 which carries the swinging blade are approximately parallel with each other, as indicated in Fig. 1, that is when the tool is opened, the handles 2 and 12 lie close enough together that they may be gripped in one hand. In using the tool it is slipped down over the weed or plant to be removed, one of the blades lying on each side of the weed or plant. The foot is then placed upon the foot rest and both blades are forced into the ground. If the pressure is mainly a direct downward pressure on the foot rest 5, the two blades will remain in approximately the same relation to each other as shown in Fig. 1; but, as soon as the pressure of the foot is shifted so as to bring it largely directly above the vertical arm, 7, of the frame which carries the small blade 6, this latter blade is forced inwardly toward the blade 3, so that the root of the weed or plant will be gripped between the two blades. The two handles have now approached each other as shown in Fig. 2, and the only work that need be done with the hand is that of lifting the tool with the weed or plant gripped therein, and hold the tool closed until the weed or plant is to be removed. It will be seen that where transplanting is to be done, the plant need not be removed from the tool; but, after the plant has been liftd out of its original setting, it may be carried in the tool to the place where it is to be replanted, the tool being forced down into the ground and then being opened sufficiently to let go of the root of the plant. Then, upon withdrawing the tool from the ground, the plant will be left in its new position, transplanted.

The gripping faces of the jaws or blades may be roughened or provided with teeth, 14, to enable them to take a firm grip on a weed or other plant.

It will thus be seen that I have produced a simple and novel tool, constructed of but a few parts, which is comparatively light, which may be driven into the ground and closed upon a plant root with great force derived from the pressure of the foot, while the work which must be done by the hand of the user is simply that of supporting the weight of the tool and any plant or other article gripped therein.

While I have illustrated and described with particularity only a single preferred form of my invention, I do not desire to be limited to the exact structional details thus illustrated and described; but intend to cover all forms and arrangements which come within the terms employed in the definitions of my invention constituting the appended claims.

I claim:

1. A tool of the character described comprising a stem terminating in a blade at its lower end, a foot rest at the upper end of said blade, a transverse rocking bar pivotally supported between its ends by said foot rest, a blade extending downwardly from one end of said bar in front of the other blade, a handle on the upper end of said stem, a second handle arranged in the vicinity of the aforesaid handle and movable from and toward the same, and a connecting rod arranged between said second handle and the rear end of said rocking bar.

2. A tool of the character described comprising a stem terminating at its lower end in a blade and having a transverse foot rest at the upper end of the blade, an L-shaped frame having one arm lying in front of said blade and the other arm extending from front to rear across said foot rest, the vertical arm of said frame having at its lower end a blade, the horizontal arm of the frame being pivotally supported on said foot rest at a point between its ends so as to permit the blade carried by the frame to be swung toward and away from the other blade, and a connecting rod extending from the rear end of the horizontal arm of said frame to the vicinity of the upper end of said stem.

3. A tool of the character described comprising a stem terminating at its lower end in a blade and having a transverse foot rest at the upper end of the blade, an L-shaped frame having one arm lying in front of said blade and the other arm extending from front to rear across said foot rest, the vertical arm of said frame having at its lower end a blade, the horizontal arm of the frame being pivotally supported on said foot rest at a point between its ends so as to permit the blade carried by the frame to be swung toward and away from the other blade, and means for actuating said frame extending from the rear end of the horizontal arm of said frame to the vicinity of the top of said stem.

4. A tool of the character described comprising a stem terminating at its lower end in a blade and having a transverse foot rest at the upper end of the blade, an L-shaped frame having one arm lying in front of said blade and the other arm extending from front to rear across said foot rest, the vertical arm of said frame having at its lower end a blade, the horizontal arm of the frame being pivotally supported on said foot rest at a point between its ends so as to permit the blade carried by the frame to be swung toward and away from the other blade, a handle movably supported on said stem, and a connection between the rear end of said frame and said handle.

5. A tool of the character described comprising a stem terminating at its lower end in a blade and having a transverse foot rest at the upper end of the blade, an L-shaped frame having one arm lying in front of said blade and the other arm extending from front to rear across said foot rest, the vertical arm of said frame having at its lower end a blade, the horizontal arm of the frame being pivotally supported on said foot rest at a point between its ends so as to permit the blade carried by the frame to be swung toward and away from the other blade, a transverse handle on the upper end of said stem, a rod extending upwardly from the rear end of the horizontal arm of said frame to a point near the upper end of the tool, and a handle member connected to the upper end of said rod and slidably mounted on said stem in such relation to the handle on the stem that both may be grasped in one hand.

6. A tool of the character described comprising a stem having its lower end bent back upon itself to form a blade adapted to be thrust into the ground, that portion of the stem just above the blade being bent so as to form a stirrup having a horizontal foot rest, an L-shaped frame made of a rod having a horizontal arm wrapped around the foot rest element of said stirrup between the ends of said arm and having its other arm extending in the vertical direction in front of said blade, said vertical arm having at its lower end a blade adapted to cooperate with the other blade, and an actuator connected to the rear end of the horizontal arm of said frame.

7. A tool of the character described comprising a stem having its lower end bent back upon itself to form a blade adapted to be thrust into the ground, that portion of the stem just above the blade being bent so as to form a stirrup having a horizontal foot rest, an L-shaped frame made of a rod having a horizontal arm wrapped around the foot rest element of said stirrup between the ends of said arm and having its other arm extending in the vertical direction in front of said blade, said vertical arm having at its lower end a blade adapted to cooperate with the other blade, a handle extending laterally at the upper end of said stem, a second handle arranged parallel with the other handle and slidable on the frame, and a connecting rod between said second handle and the rear end of the horizontal arm of said frame.

In testimony whereof, I sign this specification.

WILLIAM H. HENNINGS.